(12) United States Patent
Borrowman et al.

(10) Patent No.: US 7,121,794 B2
(45) Date of Patent: Oct. 17, 2006

(54) COMPONENT ASSEMBLY FOR RECONFIGURING A CENTRIFUGAL PUMP

(75) Inventors: David P. Borrowman, Murray, UT (US); Brandon R. Doering, West Jordan, UT (US)

(73) Assignee: EnviroTech Pumpsystems, Inc., Salt Lake City, UT (US)

(*) Notice: Subject to any disclaimer, the term of this patent is extended or adjusted under 35 U.S.C. 154(b) by 54 days.

(21) Appl. No.: 10/858,350

(22) Filed: Jun. 1, 2004
(Under 37 CFR 1.47)

(65) Prior Publication Data
US 2005/0013690 A1    Jan. 20, 2005

Related U.S. Application Data

(60) Provisional application No. 60/475,104, filed on Jun. 2, 2003.

(51) Int. Cl.
    *F04D 29/42* (2006.01)
(52) U.S. Cl. .................. 415/204; 415/206; 415/214.1; 415/912; 29/401.1; 29/888.021; 29/889.1
(58) Field of Classification Search ................ 415/912, 415/204, 206, 214.1, 196, 197, 121.3, 232; 29/888.021, 401.1, 889.1
See application file for complete search history.

(56) References Cited

U.S. PATENT DOCUMENTS

| 3,316,848 A | * | 5/1967 | Egger | .................. 415/204 |
| 3,841,791 A | * | 10/1974 | Doolin | .................. 415/912 |
| 4,338,062 A | * | 7/1982 | Neal | .................. 415/912 |

OTHER PUBLICATIONS

Wemco Model C Torque-Flow Pump Product Brochure, 1992 (8 pages).

* cited by examiner

*Primary Examiner*—Christopher Verdier
(74) *Attorney, Agent, or Firm*—Morriss O'Bryant Compagni, P.C.

(57) ABSTRACT

A component assembly is provided for converting a conventional centrifugal pump, of the vortex impeller type for example, to a different type of centrifugal pump, such as a spiral impeller pump. The component assembly enables a resident centrifugal pump to be converted to a more efficient or appropriate type of industrial pump when conditions or application processing requirements change, and avoids the need to entirely replace an installed pump for a new type of pump.

7 Claims, 4 Drawing Sheets

COMPONENT ASSEMBLY FOR RECONFIGURING A CENTRIFUGAL PUMP

CROSS-REFERENCE TO RELATED APPLICATION

This application is a non-provisional application claiming priority to provisional patent application Ser. No. 60/475,104 filed Jun. 2, 2003.

BACKGROUND OF THE INVENTION

1. Field of the Invention

This invention relates to centrifugal pumps of the industrial type and specifically relates to providing an assembly of components for converting a centrifugal pump having a vortex-type impeller to a centrifugal pump having a spiral-type impeller for expanding the usefulness of the pump and increasing pump operation.

2. Description of Related Art

Centrifugal pumps are used in many industries to pump either clear water or slurries, the latter of which contain both fluid and solid components. The solids content of slurries vary in type and size, but all slurries are abrasive to some degree on the components of the pump. Therefore, centrifugal pumps are structured with varying abilities to withstand the varying degrees of abrasiveness of slurries. Pumps are consequently selected for their ability to process slurries of a given abrasiveness.

A centrifugal pump of the vortex type is one example of a slurry pump that is particularly constructed to process very abrasive slurries. The impeller of a vortex pump is made of very hard metal materials to withstand highly abrasive types of slurries. The impeller is particularly shaped to receive the influent slurry so that the solids content is processed by the impeller in a manner that reduces the impact of the solids on the impeller, thereby lessening the degradation of the impeller. The impeller may be configured with recessed areas between the impeller vanes which further contribute to the ability to process the slurry while lessening the impact of the solids on the impeller. Such impellers are known as recessed vortex impellers.

While vortex impellers are well-suited for their intended purpose, it is a natural consequence of the construction of vortex impellers, especially recessed vortex impellers, that certain pump efficiency is sacrificed due to the fact that the impeller is recessed from the main flow path of the fluid entering the pump. Occasions arise where the nature of the slurry being processed in a given installation changes, such as in a municipal waste facility. While the vortex centrifugal pump that is installed in the facility may still be operational, the fact that a vortex pump is less efficient than other types of centrifugal pumps becomes problematic to the optimal operation of the plant. In many instances, the vortex pump may be shut down and the installation modified to bypass the vortex pump in favor of processing the influent in a more efficient manner.

Thus, it would be beneficial in processing industries to provide a means by which a less efficient vortex centrifugal pump may be converted to a more efficient type of centrifugal pump responsive to a change in the type of slurries being processed, and in doing so employ the same pump casing and drive system of the existing vortex centrifugal pump to avoid having to replace the entire pump or having to modify the entire installation, both of which are extremely costly to plant operation.

BRIEF SUMMARY OF THE INVENTION

In accordance with the present invention, a components assembly is provided for replacing the vortex-type impeller and related elements of a vortex-type centrifugal pump to convert the centrifugal pump to a more efficient type of pump, such as a spiral impeller-type centrifugal pump, using the same pump casing, drive assembly and seal assembly of the existing centrifugal pump. The components assembly of the present invention is adaptable for use in converting virtually any centrifugal pump of one impeller type to a centrifugal pump of a different impeller type, but is described herein by way of example only with respect to converting a vortex impeller pump to a spiral impeller pump.

The component assembly of the present invention generally comprises a new and different type of impeller that is selected to replace the current impeller of the centrifugal pump for improved or application-adapted operation. The component assembly also includes a back plate for positioning between the new impeller and the drive side casing of the pump casing to adapt the new impeller to the pump casing. A back plate may not always be necessary in that the new impeller may be configured especially to be adapted to an existing pump casing.

The component assembly of the present invention also may comprise a suction cover that is adapted to the new and different type of impeller of the component assembly. The suction cover is configured for attachment to the existing pump casing. The component assembly may not necessarily include a new suction cover if the original suction cover of the pump can be used and/or adapted to the new type of impeller that is installed in the existing pump casing. It may require a special designing of the new impeller to accommodate the existing suction cover, however.

The back plate and suction cover of the component assembly of the present invention are particularly structured and configured for attachment to the existing pump casing of the centrifugal pump. That is, they are structured with attachment points for securement, usually by means of bolts or pins, to the pump casing.

In some pump conversions, depending on the type of new impeller being installed in the existing pump casing, the component assembly of the present invention may also include an impeller adapter member, or impeller flange, to adapt the new impeller to the back plate of the component assembly or to the existing pump casing of the pump. An impeller adapter member may not always be required to effect the conversion, however.

The component assembly of the present invention allows an existing centrifugal pump in an installation to be converted to a more efficient type of pump without having to remove and replace the entire pump from the installation, and allows the existing pump to have continued use in the installation rather than having to modify the installation to avoid use of the less efficient vortex pump, which substantially affects plant operation and cost efficiencies. The present invention also allows the use of existing piping dimensions which advantageously effects operation and cost efficiencies. These and other advantages of the present invention are described further in the detailed description of the drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
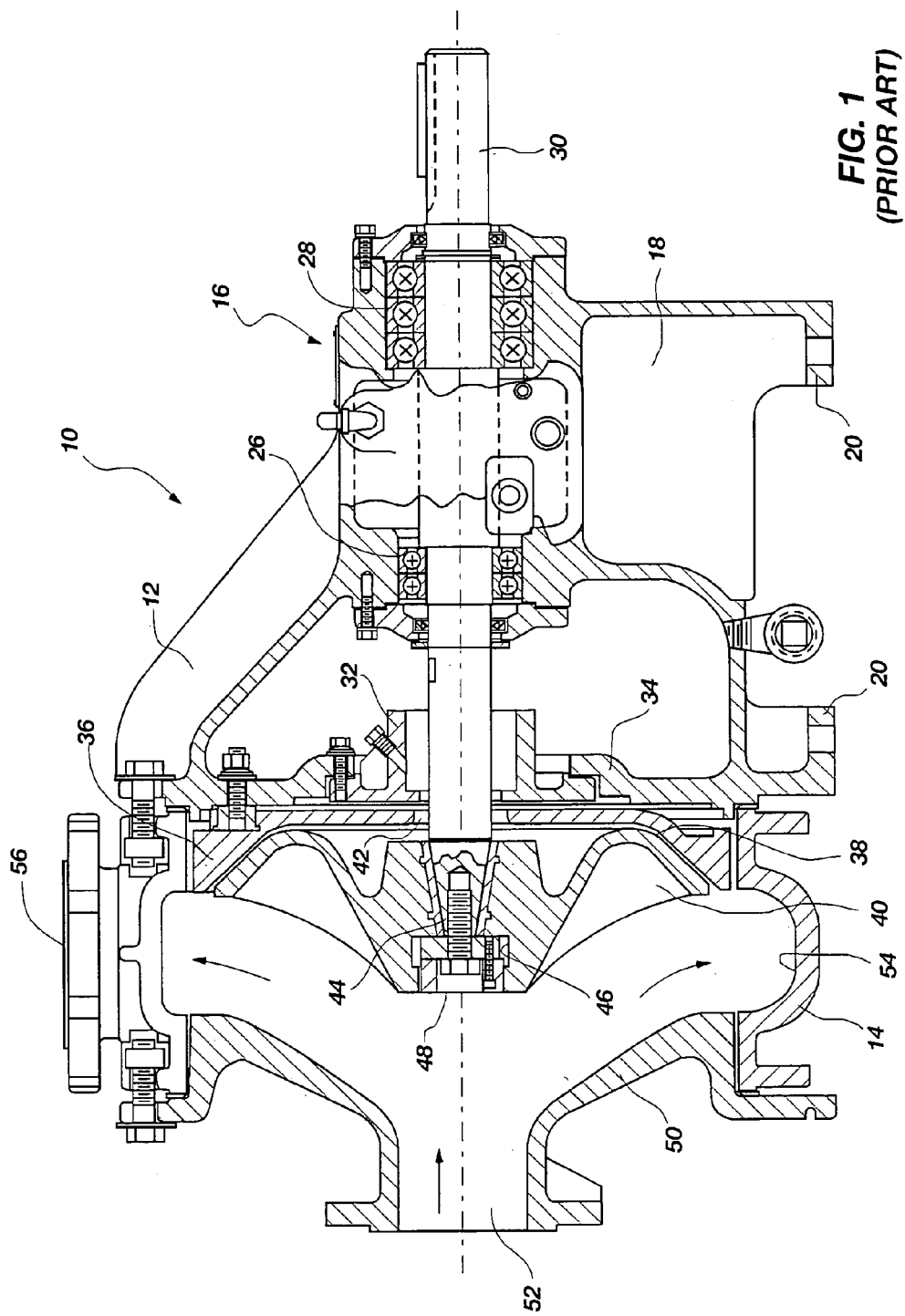
FIG. 1 is a longitudinal cross section of a conventional vortex-type centrifugal pump.
Figure 2:
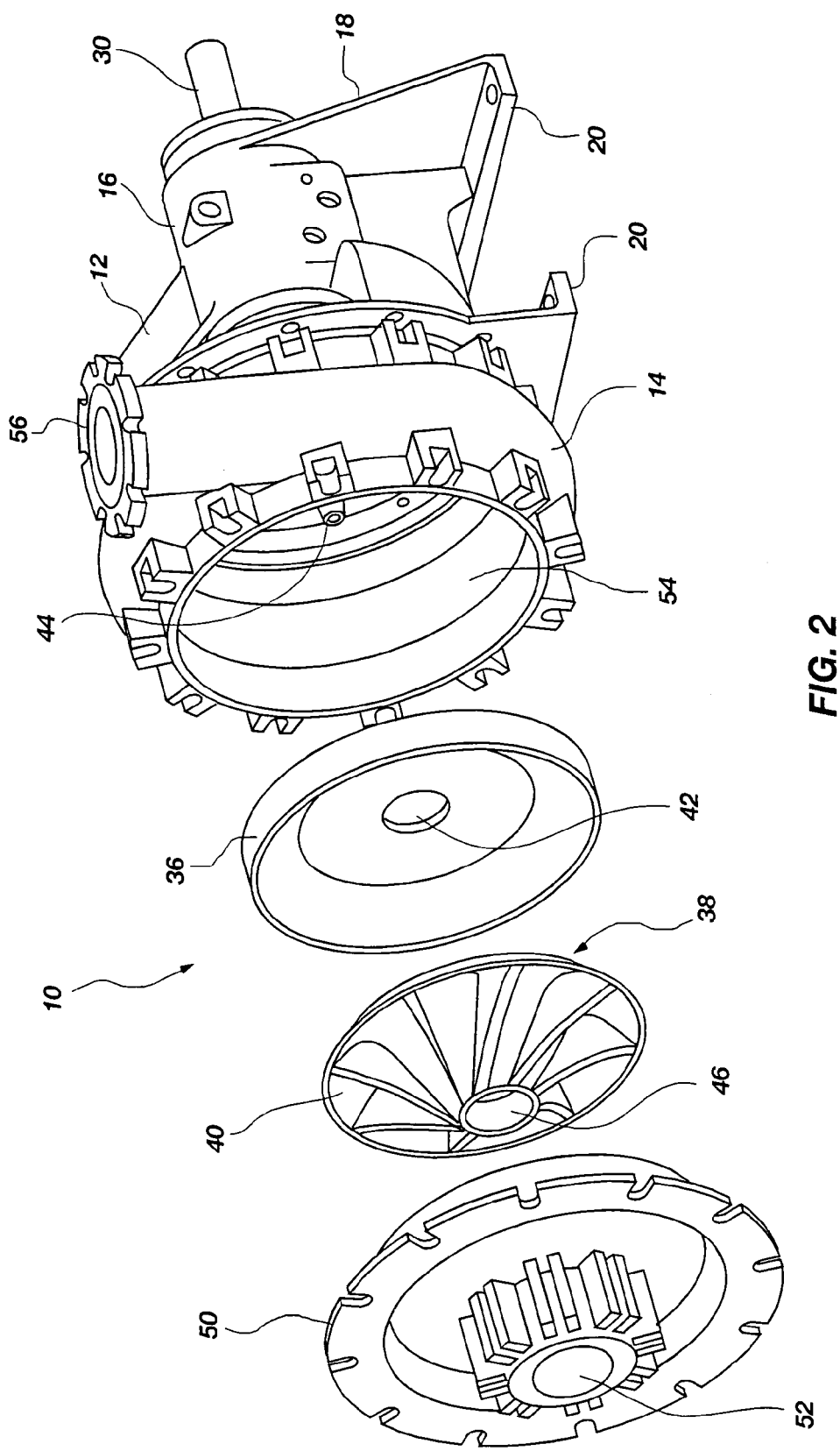
FIG. 2 is an exploded view of the main components of a conventional vortex-type centrifugal pump.

FIGS. 1 and 2 illustrate the general structural elements of a centrifugal pump 10 of the prior art, and in particular, a centrifugal pump 10 of the type having a vortex impeller. The vortex pump 10 generally comprises a drive side casing 12 and a volute casing 14 which is bolted on to the drive side casing 12. The drive side casing 12 includes a bearing housing 16 and a pedestal portion 18 having feet 20 for anchoring the drive side casing 12 to a surface, such as a floor. The bearing housing 16 houses a forward bearing assembly 26 and a rear bearing assembly 28 which support a drive shaft 30 extending through the drive side casing 12. The drive shaft 30 also extends through a seal assembly 32 that is located in or near the end plate 34 of the drive side casing 12.

The vortex centrifugal pump 10 further comprises a wear plate 36 that registers against and is bolted to the drive side casing 12, as best shown in FIG. 1. The wear plate 36, as best shown in FIG. 2, is bowl-shaped to receive the back side 38 of the impeller 40. The wear plate 36 is formed with a central opening 42 through which the terminal end 44 of the drive shaft 30 extends. The impeller 40 is also formed with a central opening 46 into which the terminal end 44 of the drive shaft 30 is received. As best seen in FIG. 1, the impeller 40 is secured to the drive shaft 30 by a threaded bolt 48 that is threadingly received in the terminal end 44 of the drive shaft 30.

The vortex pump 10 also comprises a suction side cover 50 that bolts on to the volute casing 14. The suction side cover 50 has a centrally formed opening that defines the inlet 52 of the pump 10. It can be seen that slurry entering the pump 10 through the inlet 52 encounters the rotating vortex impeller 40 and is conveyed to the volute 54 of the pump 10, and then exits through the outlet 56 of the pump 10.

Figure 3:
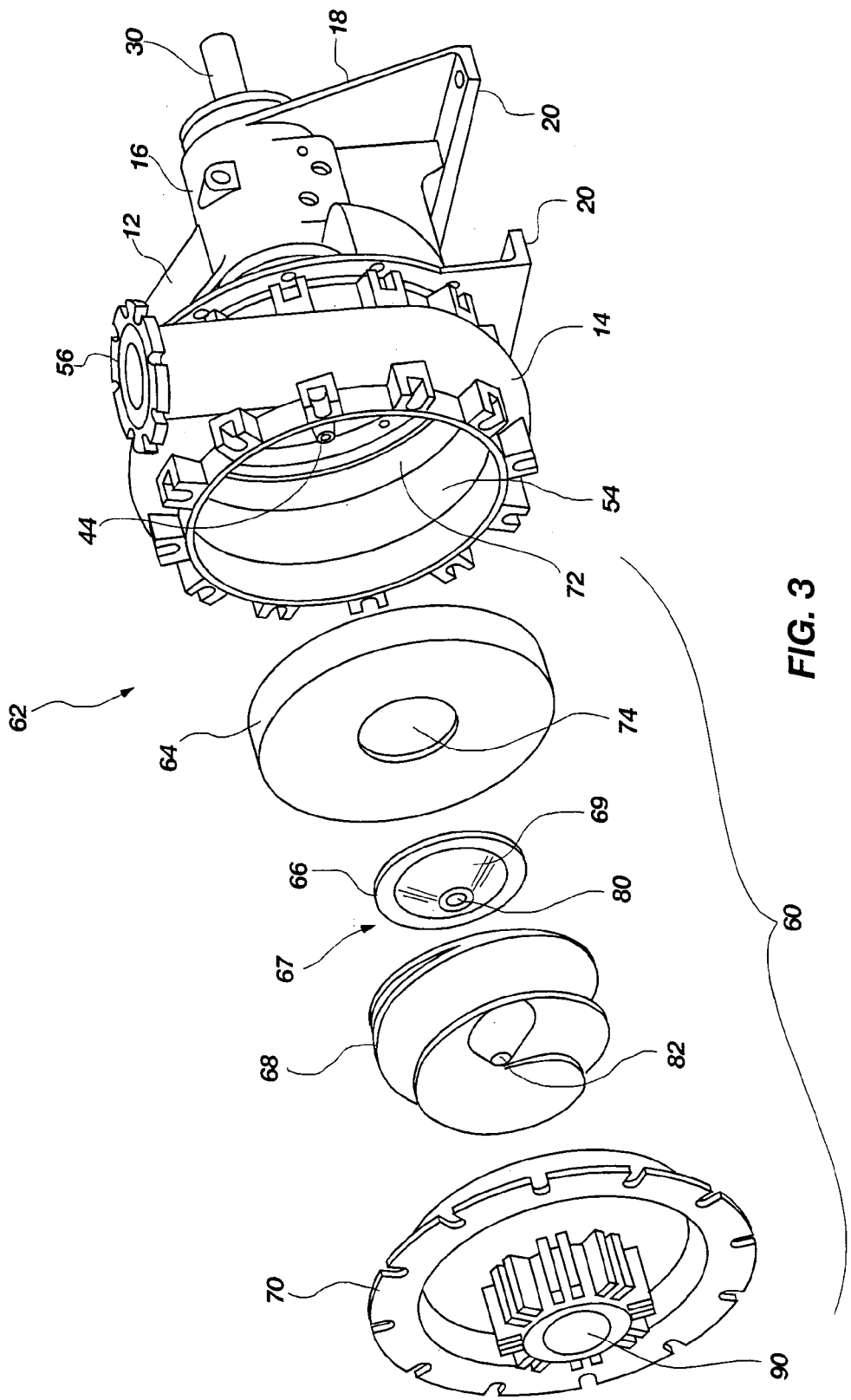
FIG. 3 is an exploded view of the elements of the conversion assembly of the present invention providing conversion of the centrifugal pump from a vortex impeller to a spiral impeller.

The component assembly 60 of the present invention is shown in FIG. 3, which is an exploded perspective view of a reconfigured centrifugal pump 62. The component assembly 60 may generally comprise a back plate 64, an impeller adapter 67, a new and differently configured impeller, shown here as a spiral-type impeller 68, and a newly configured suction side cover 70. In all other respects, the reconfigured centrifugal pump 62 is comprised of the same elements of the existing pump (i.e., drive side casing 12, volute casing 14, drive shaft 30, etc.) as noted by the use of the same reference numerals to designate parts.

Figure 4:
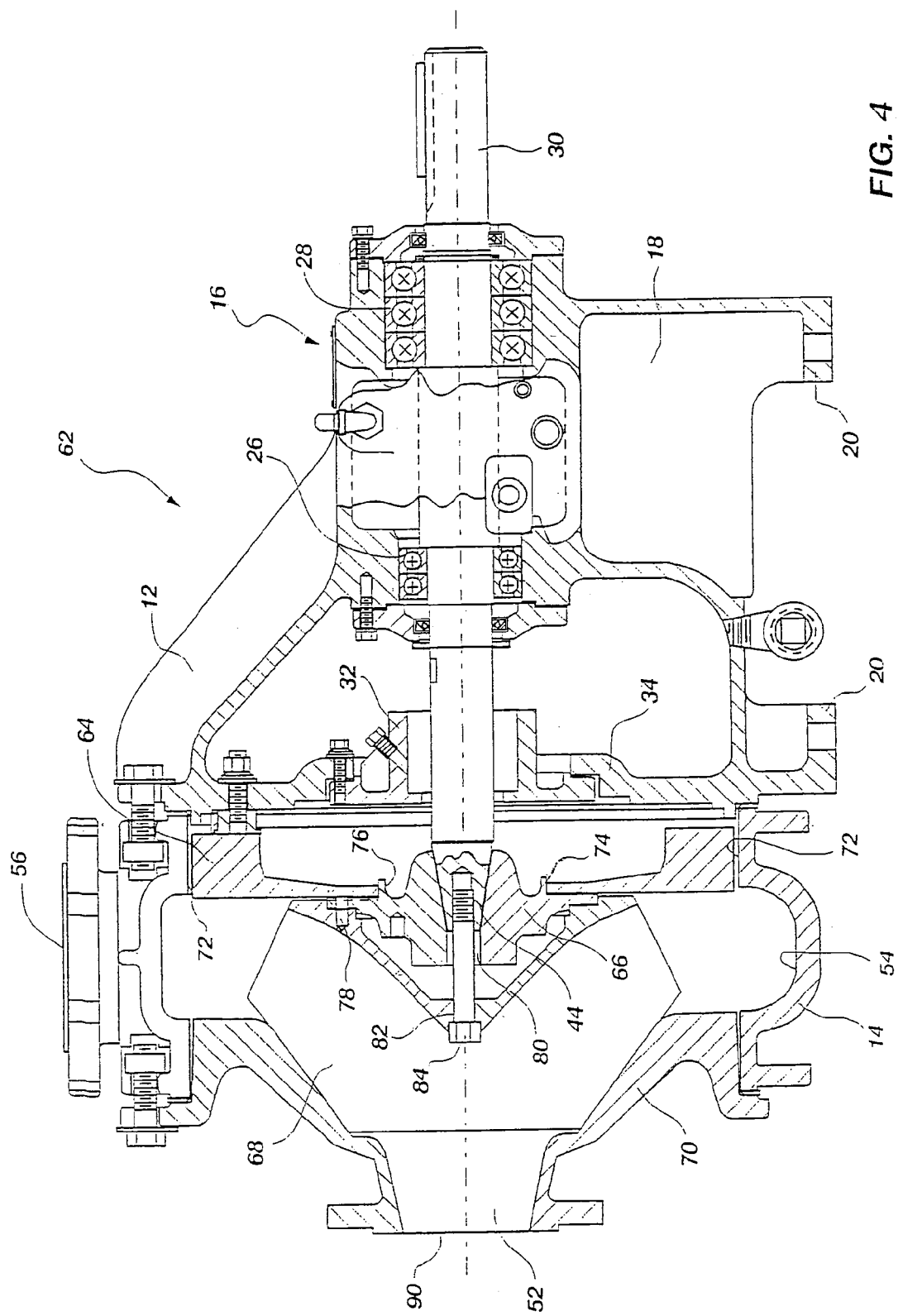
FIG. 4 is a longitudinal cross section of a centrifugal pump as shown in FIG. 3 that has been converted by means of the present invention to a spiral impeller pump.

As best seen in FIG. 4, the back plate 64 of the component assembly is sized to be received in the circumferential drive side opening 72 of the volute casing 14 and to register against, and be bolted to, the end plate 34 of the drive side casing 12. The back plate 64 is formed with a centrally-positioned opening 74 through which the terminal end 44 of the drive shaft 30 extends. The back plate 64 is provided to facilitate adaptation of the new impeller 68 to the existing pump casing 12, 14. However, a back plate 64 may not be required in all applications, especially where the new impeller may be particularly designed for placement in an existing pump of known configuration.

An impeller adapter 67 may also be provided as part of the component assembly 60 of the present invention to adapt the new type impeller to the existing pump casing 12, 14. The impeller adapter 67 may be configured for use alone or in tandem with a back plate 64 as illustrated. The impeller adapter is shown in FIG. 4 as an impeller flange 66 which is structured with an axially extending collar 76 that is sized to be received in, and to extend into, the centrally-positioned opening 74 of the back plate 64. The impeller flange 66 is structured to register against the back plate 64 and to be positioned between the impeller 68 and the back plate 64. The impeller adapter 67 may be any suitable shape for adaptively securing the new impeller 68 to the existing pump casing 12, 14. The impeller flange 66 is illustrated as having a conically-shaped side 69 that is configured to be received in or against the new impeller 68.

The new impeller 68 may, in turn, be secured to the impeller flange 66 by means such as bolts or pins 78. The impeller flange 66 is also formed with a central opening 80 for receipt of the terminal end 44 of the drive shaft 30 therein. The central opening 80 is axially aligned with a central opening 82 formed in the new impeller 68 through which a threaded bolt 84 is extended to secure the new impeller 68 to the terminal end 44 of the drive shaft 30.

The new impeller 68 of the present invention may be virtually any type of impeller that is suitable for use in a centrifugal pump. The new impeller 68 illustrated in FIGS. 3 and 4 is a spiral-type impeller, by way of example only. A spiral-type impeller 68 is capable of processing mild or slightly abrasive slurries, but is also capable of providing comparatively greater pump efficiencies than a vortex pump. A spiral-type impeller 68 operates in a similar manner, however, to convey slurry entering through the inlet 52 of the pump 62 to the outlet 56 of the pump 62.

The component assembly of the present invention may also include a suction side cover 70 which is likewise configured to accommodate the configuration of the new impeller, or spiral-type impeller 68, as shown in FIG. 4. The suction side cover 70 is formed with a central opening 90 which defines the inlet 52 of the pump 62. The configuration of the suction side cover 70 is not only important to accommodating the shape and size of a new impeller 68, but may also be important to the proper processing of the slurry from the inlet 52 to the outlet 56 of the pump 62. However, it may be possible in some applications to use the existing suction side cover of the pump with a new impeller 68 type.

In converting the existing centrifugal pump 10 from, for example, a vortex impeller type to a spiral impeller type, in accordance with the invention, the old suction side cover 50 is unbolted from the volute casing 14, the vortex impeller 40 is unbolted from the terminal end 44 of the drive shaft 30 and the impeller 40 is removed from within the wear plate 36. The wear plate 36 is then unbolted from the drive side casing 12 and is removed. All other components of the pump remain in place, including the drive shaft 30.

The back plate 64 of the component assembly 60 of the present invention is then positioned within the circumferential drive side opening 72 of the volute casing 14 and registered against the drive side casing 12. The back plate 64 is then bolted in place against the drive side casing 12. The impeller flange 66 is next positioned over the terminal end 44 of the drive shaft 30 with the axially-extending collar 76 positioned through the central opening 74 of the back plate 64. The spiral impeller 68 is then positioned over the impeller flange 66 and is secured to the terminal end 44 of the drive shaft 30. The new suction side cover 70 is then positioned against and bolted to the volute casing 14 as shown. The newly configured pump 62 is then ready for operation The component assembly of the present invention is provided for configuring an existing centrifugal pump of one type, defined by the type of impeller installed in the pump, to a new type of centrifugal pump having a different type of impeller. The component assembly thereby enables the conversion of an existing centrifugal pump to a new type of pump that can meet changes in pumping applications, or increase pumping efficiencies in a resident installation or pumping application. By enabling the conversion of a resident centrifugal pump to a new type of pump, operation costs are significantly reduced since a whole new pump does not need to be installed and the amount of down-time required to provide the installation with a better or more efficient pump is significantly reduced.

Thus, the component assembly of the present invention can be adapted for use in converting virtually any type of centrifugal pump to a new type of pump. Hence, reference herein to specific details of the invention, particularly as may be illustrated in the drawings is by way of example only and not by way of limitation.

What is claimed is:

1. A component assembly for reconfiguring a centrifugal pump to a different type of centrifugal pump, comprising:
    a back plate sized to be received adjacent a drive casing of a centrifugal pump and to accommodate a drive shaft of the centrifugal pump;
    a new replacement impeller of a type different from an original impeller of the centrifugal pump, said new replacement impeller being a spiral-type impeller configured to register against said back plate and being structured for securement to the terminal end of the drive shaft of the centrifugal pump; and
    a suction side cover having a central opening defining an inlet for the centrifugal pump, said suction side cover being configured to accommodate said new replacement impeller.

2. The component assembly of claim 1 further comprising an impeller adapter structured to receive the terminal end of an existing drive shaft and configured to register between said back plate and said new replacement impeller.

3. The component assembly of claim 2 wherein said impeller adapter is structured with a central opening to receive the terminal end of an existing drive shaft of a pump.

4. The component assembly of claim 2 wherein said back plate is structured with a central opening sized to receive an existing drive shaft of a pump and to receive said impeller adapter therein.

5. The component assembly of claim 1 further comprising an impeller flange having a conically-shaped surface for positioning toward said spiral type impeller, said impeller flange further being structured with a central opening for receiving the drive shaft therethrough.

6. The component assembly of claim 1 wherein said back plate is formed with a central opening to receive the drive shaft therethrough.

7. A method for reconfiguring an existing type of centrifugal pump to a different type of centrifugal pump, comprising:
    providing a centrifugal pump of a first type having a resident impeller and further comprising:
        a drive side casing;
        a drive shaft extending through said drive side casing;
        a volute casing secured to said drive side casing;
        said resident impeller received by and secured to said drive shaft; and
        a suction side cover secured to said volute casing and sized to accommodate said resident impeller;
    providing a component assembly for converting the centrifugal pump to a new type of centrifugal pump, comprising a back plate, and further comprising a new type of impeller and a new suction side cover configured to accommodate said new type of impeller;
    removing said existing suction side cover from said volute casing;
    releasing said resident impeller from securement with said drive shaft;
    positioning and securing said back plate from said component assembly against said drive side casing and about said drive shaft and securing to said pump casing;
    positioning said new impeller against said back plate;
    securing said new impeller to said drive shaft; and
    positioning said new suction side cover, configured to accommodate said new impeller, against said volute casing and securing said new suction side cover to said volute casing outside of said volute casing.

* * * * *